(12) United States Patent
Liu

(10) Patent No.: US 11,570,633 B2
(45) Date of Patent: Jan. 31, 2023

(54) NETWORK CONFIGURATION METHOD, APPARATUS, NETWORK ELEMENT, AND SYSTEM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/757,589

(22) PCT Filed: Nov. 16, 2017

(86) PCT No.: PCT/CN2017/111356
§ 371 (c)(1),
(2) Date: Apr. 20, 2020

(87) PCT Pub. No.: WO2019/095204
PCT Pub. Date: May 23, 2019

(65) Prior Publication Data
US 2021/0204146 A1 Jul. 1, 2021

(51) Int. Cl.
*H04W 24/02* (2009.01)
*H04W 28/06* (2009.01)
*H04W 84/04* (2009.01)

(52) U.S. Cl.
CPC .......... *H04W 24/02* (2013.01); *H04W 28/06* (2013.01); *H04W 84/042* (2013.01)

(58) Field of Classification Search
CPC .... H04W 24/02; H04W 28/06; H04W 84/042
See application file for complete search history.

(56) References Cited

U.S. PATENT DOCUMENTS

| 2010/0246504 A1* | 9/2010 | Kim | H04W 72/1278 |
|---|---|---|---|
| | | | 370/329 |
| 2015/0365995 A1* | 12/2015 | Tabet | H04W 76/28 |
| | | | 370/311 |

(Continued)

FOREIGN PATENT DOCUMENTS

| CN | 101237677 | 8/2008 |
|---|---|---|
| CN | 101370266 | 2/2009 |

(Continued)

OTHER PUBLICATIONS

WIPO, ISR for PCT/CN2017/111356, dated Aug. 13, 2018.

(Continued)

*Primary Examiner* — Wayne H Cai
(74) *Attorney, Agent, or Firm* — Hodgson Russ LLP

(57) ABSTRACT

The embodiments of the present application provide a network configuration method, apparatus, network element, and system. The method includes: receiving, by a first network element, a service attribute of a terminal sent by a second network element, wherein the first network element is a network element in a mobile communication network, and the second network element is a network element in an external network; and configuring, by the first network element, a network operation parameter of the terminal according to the service attribute of the terminal.

15 Claims, 4 Drawing Sheets

(56) References Cited

U.S. PATENT DOCUMENTS

| | | | |
|---|---|---|---|
| 2016/0227457 A1 | 8/2016 | Tanaka et al. | |
| 2016/0262045 A1* | 9/2016 | Yang | H04W 4/70 |
| 2016/0269996 A1* | 9/2016 | Wu | H04W 52/0216 |
| 2017/0195820 A1* | 7/2017 | Rune | H04W 76/12 |
| 2017/0201923 A1* | 7/2017 | Yang | H04W 36/245 |
| 2017/0303114 A1* | 10/2017 | Johansson | H04L 65/607 |
| 2019/0222499 A1* | 7/2019 | Chen | H04L 41/16 |
| 2020/0252813 A1* | 8/2020 | Li | G06Q 20/382 |
| 2021/0036962 A1* | 2/2021 | Debenedetti | H04L 47/36 |

FOREIGN PATENT DOCUMENTS

| | | |
|---|---|---|
| CN | 102123477 A | 7/2011 |
| CN | 103475512 | 12/2013 |
| CN | 103686866 A | 3/2014 |
| CN | 104717709 | 6/2015 |
| JP | 2010529707 | 8/2010 |
| JP | 2014514831 | 6/2014 |
| JP | 2020530703 A | 10/2020 |
| WO | 2019032968 A1 | 2/2019 |

OTHER PUBLICATIONS

Huawei et al., "Updates to 'Solution 2.3: Content requirement Aware QoS Framework,'" SA WG2 Meeting #115, S2-162564, May 2016, 11 pages.

Motorola Mobility et al., "Application Function influence on slice selection," SA WG2 Meeting #122bis, S2-175862 (revision of S2-174262), Aug. 2017, 5 pages.

EPO, Office Action for EP Application No. 17932231.8, dated Jul. 2, 2020.

"3rd Generation Partnership Project; Technical Specification Group Services and System Aspects; System Architecture for the 5G System; Stage 2 (Release 15)," 3GPP TS 23.501, Jun. 2017, v1.0.0, 147 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401, Dec. 2015, v13.5.0, 337 pages.

Huawei et al., "TS 23.502: Provide the UE Information by External Party via NEF," SA WG2 Meeting #123, S2-178170 (Revision of S2-177963) (Revision of S2-177626) (Revision of S2-177515), Oct. 2017, 4 pages.

"3rd Generation Partnership Project; Technical Specification Group Services and System Aspects; Procedures for the 5G System; Stage 2 (Release 15)," 3GPP TS 23.502, Nov. 2017, v1.3.0, 215 pages.

IPI, Office Action for IN Application No. 202017020068, dated Jun. 10, 2021.

JPO, Office Action for JP Application No. 2020-519327, dated Oct. 1, 2021.

KIPO, Office Action for KR Application No. 10-2020-7009854, dated Aug. 30, 2021.

EPO, Communication Pursuant to Article 94(3) EPC issued in EP Application No. 17932231.8, dated Mar. 2, 2022.

KIPO, Notification of Reason for Refusal issued in KR Application No. 10-2020-7009854, dated Mar. 28, 2022.

JPO, Notice of Reasons for Refusal issued in JP Application No. 2020-519327, dated May 13, 2022.

CNIPA, Office Action for CN Application No. 202110808841.5, dated Sep. 29, 2022.

KIPO, Office Action for KR Application No. 10-2020-7009854, dated Sep. 29, 2022.

\* cited by examiner

“NETWORK CONFIGURATION METHOD, APPARATUS, NETWORK ELEMENT, AND SYSTEM”

CROSS-REFERENCE TO RELATED APPLICATION

This application is a U.S. national phase application of International Application No. PCT/CN2017/111356, filed Nov. 16, 2017, the entire disclosure of which is incorporated herein by reference.

TECHNICAL FIELD

Embodiments of the present disclosure generally relate to communication technologies, and more particularly, to a network configuration method, a network configuration device, a network element and a system.

BACKGROUND

With the continuous development of communication technologies, the 5th generation (5G) network will support more diverse business needs and scenarios, such as enhanced Mobile Broadband (eMBB), massive Machine Type Communication (mMTC), ultra reliable Machine Type Communication (uMTC), and so on.

Because the application layer of the 5G network includes all applications in three scenarios: eMBB, mMTC and uMTC, the future 5G network will be coupled with a variety of external vertical networks. These external vertical networks include networks in vertical industries such as agriculture, manufacturing, logistics, transportation, living services, public services, education, finance, healthcare and energy.

There is no mature solution for how to perform the optimization between 5G networks and external vertical networks.

SUMMARY

Embodiments of the present disclosure provides a network configuration method, a network configuration device, a network element and a system, which are capable of optimizing data packet communication between a terminal in a 5G network and a network element in an external network.

According to a first aspect, there is provided a network configuration method, including:

receiving, by a first network element, a service attribute of a terminal sent by a second network element, wherein the first network element is a network element in a mobile communication network, and the second network element is a network element in an external network; and configuring, by the first network element, a network operation parameter of the terminal according to the service attribute of the terminal.

According to an exemplary embodiment, the service attribute includes:

length information of a data packet;

or, the length information of the data packet and a time period corresponding to the length information;

or, the length information of the data packet and a geographic area corresponding to the length information;

or, the length information of the data packet, the time period corresponding to the length information, and the geographic area corresponding to the length information.

According to an exemplary embodiment, the length information of the data packet includes:

a length of the data packet;

a length range of the data packet;

or, a distribution probability of the length of the data packet;

or, a distribution probability of the length range of the data packet.

According to an exemplary embodiment, the service attribute further includes:

Public Land Mobile Network (PLMN) information corresponding to the length information of the data packet;

and/or, network slice information corresponding to the length information of the data packet.

According to an exemplary embodiment, configuring, by the first network element, a network operation parameter of the terminal according to the service attribute of the terminal, includes:

configuring, by the first network element, the network operation parameter of the terminal according to the length information of the data packet;

or, configuring, by the first network element, the network operation parameter of the terminal according to the length information of the data packet, the time period corresponding to the length information, and a current time;

or, configuring, by the first network element, the network operation parameter of the terminal according to the length information of the data packet, the geographic area corresponding to the length information, and a current geographic location where the terminal is located;

or, configuring, by the first network element, the network operation parameter of the terminal according to the length information of the data packet, the time period corresponding to the length information, the current time, the geographic area corresponding to the length information, and the current geographic location where the terminal is located.

According to an exemplary embodiment, the network operation parameter includes at least one of the following parameters:

a Quality of Service (QoS) parameter;

an amount of time-frequency resources;

a transmission mode;

a security mechanism.

According to an exemplary embodiment, the service attribute includes:

arrival interval information of a data packet;

or, the arrival interval information of the data packet and a time period corresponding to the arrival interval information;

or, the arrival interval information of the data packet and a geographic area corresponding to the arrival interval information;

or, the arrival interval information of the data packet, the time period corresponding to the arrival interval information, and the geographic area corresponding to the arrival interval information.

According to an exemplary embodiment, the arrival interval information of the data packet includes:

a duration of an arrival interval of the data packet;

or, a duration range of the arrival interval of the data packet;

or, a distribution probability of the duration of the arrival interval of the data packet;

or, a distribution probability of the duration range of the arrival interval of the data packet.

According to an exemplary embodiment, the service attribute further includes:

PLMN information corresponding to the arrival interval information of the data packet;

and/or, network slice information corresponding to the arrival interval information of the data packet.

According to an exemplary embodiment, configuring, by the first network element, a network operation parameter of the terminal according to the service attribute of the terminal, includes:

configuring, by the first network element, the network operation parameter of the terminal according to the arrival interval information of the data packet;

or, configuring, by the first network element, the network operation parameter of the terminal according to the arrival interval information of the data packet, the time period corresponding to the arrival interval information, and a current time;

or, configuring, by the first network element, the network operation parameter of the terminal according to the arrival interval information of the data packet, the geographic area corresponding to the arrival interval information, and a current geographic location where the terminal is located;

or, configuring, by the first network element, the network operation parameter of the terminal according to the arrival interval information of the data packet, the time period corresponding to the arrival interval information, the current time, the geographic area corresponding to the arrival interval information, and the current geographic location where the terminal is located.

According to an exemplary embodiment, the network operation parameter includes at least one of the following parameters:

a Quality of Service (QoS) class;

a time-frequency resource location;

a transmission mode;

a security mechanism;

a paging cycle; and a sleep/wake state.

According to second aspect of embodiments of the present disclosure, there is provided a network configuration device. The network configuration device includes at least one module which is configured to implement the methods performed by the first network element in the first aspect.

According to a third aspect of embodiments of the present disclosure, there is provided a first network element. The first network element includes a processor and a memory. The memory stores at least one instruction. The processor is configured to execute the at least one instruction to implement the methods performed by the first network element according to the first aspect.

According to a fourth aspect of embodiments of the present disclosure, there is provided a computer-readable storage medium having at least one instruction stored thereon. The at least one instruction is executed by a processor to implement the methods performed by the first network element according to the first aspect.

According to a fourth aspect of embodiments of the present disclosure, there is provided a communication system, including a first network element and a second network element;

wherein:

the first network element receives a service attribute of a terminal sent by the second network element, the first network element is a network element in a mobile communication network, and the second network element is a network element in an external network; and the first network element configures a network operation parameter of the terminal according to the service attribute of the terminal.

The technical solutions according to embodiments of the present disclosure have the following advantageous technical effects:

The service attribute of the terminal is sent to the first network element in the mobile communication network by the second network element in the external network, and the first network element configures the network operation parameter(s) of the terminal according to the service attribute of the terminal. Unlike related art in which the first network element usually configures the network operation parameter(s) of the terminal according to a Scheduling Request (SR) and current channel conditions sent by the terminal, the present disclosure can implement a more optimized configuration for the terminal in conjunction with the external network, thereby improving the service transmission efficiency between the terminal and the second network element.

BRIEF DESCRIPTION OF THE DRAWINGS

In order to more clearly illustrate the technical solutions of the embodiments of the present disclosure, the drawings to be used in the embodiments will be briefly described below. Obviously, the drawings in the following description are only some examples of the present disclosure, and those skilled in the art can obtain other drawings according to the drawings without any creative work.

DETAILED DESCRIPTION

To make the objectives, technical solutions, and advantages of the present disclosure clearer, the embodiments of the present disclosure will be described in further detail below with reference to the accompanying drawings.

The "module" mentioned herein generally refers to a program or instructions stored in a memory capable of implementing certain functions. The "unit" mentioned herein generally refers to a functional structure divided logically, and the "unit" can be realized by hardware only or by a combination of software and hardware.

As used herein, "a plurality of" refers to two or more. The term "and/or" describes the association relationship between related objects and indicates that there can be three types of relationships. For example, A and/or B can indicate that there are three cases: A exists alone, A and B exist, and B exists alone. The character "/" generally indicates that the related objects are an "or" relationship. The terms "first", "second" and similar words used in the specification and claims do not indicate any order, quantity, or importance, but are only used to distinguish different components.

Figure 1:
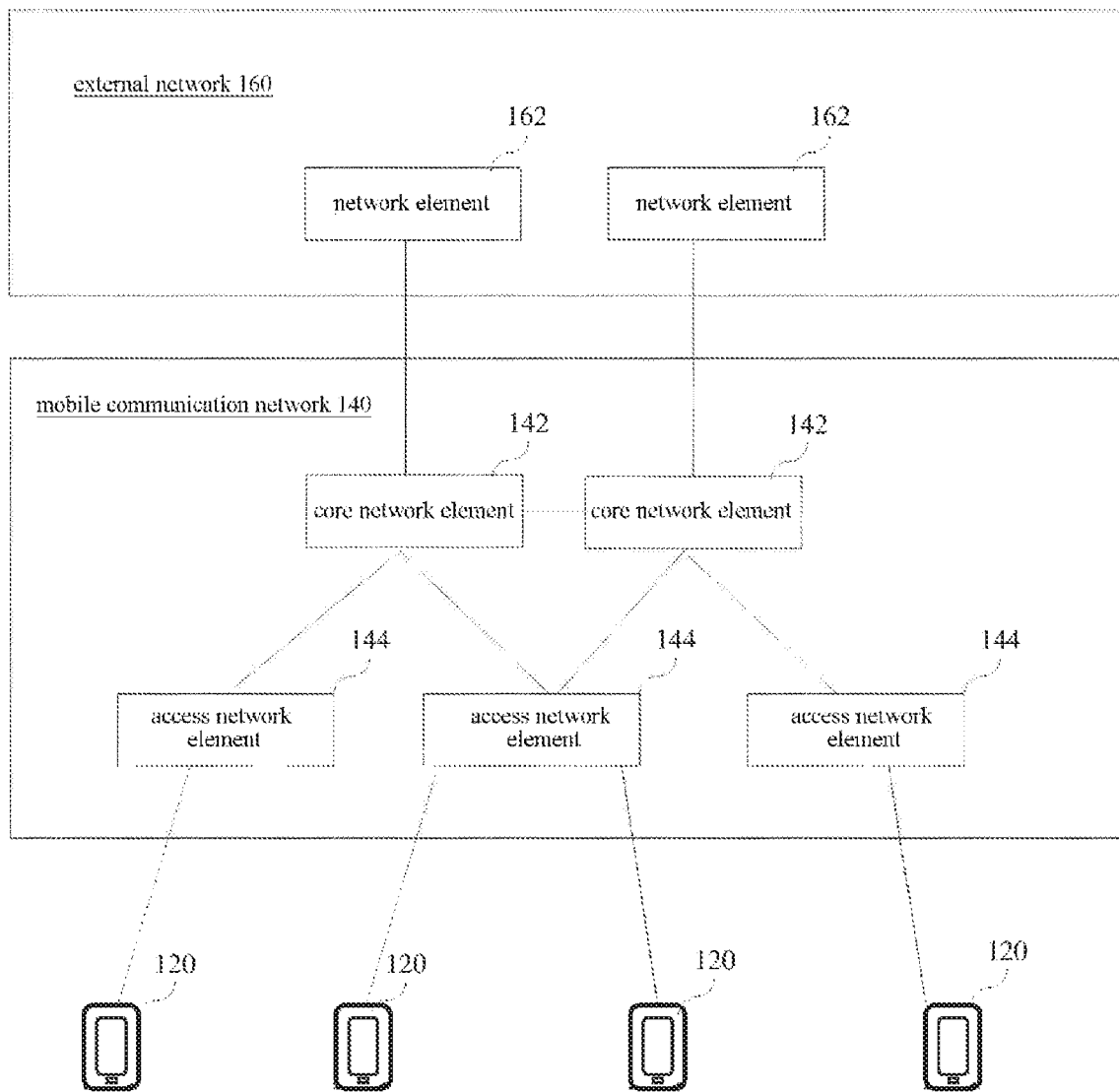
FIG. 1 is a schematic structural diagram of a communication network according to an exemplary embodiment of the present disclosure.

FIG. 1 is a schematic structural diagram of a communication network 100 according to an embodiment of the present disclosure. The communication network 100 includes a terminal 120, a mobile communication network 140, and an external network 160.

The terminal 120 may be a mobile terminal, such as a mobile phone (or a "cellular" phone) and a device having mobile communication capabilities. For example, the terminal 120 may be a portable, compact, handheld, built-in computer, or vehicle-mounted mobile terminal. In different mobile communication networks, the terminal 120 may have different names, for example, mobile station, mobile, access terminal, user terminal, user agent, user device, or user equipment.

The mobile communication network 140 may be a Third Generation Partnership Project (3GPP) network. The 3GPP network includes, but is not limited to: a Long-Term Evolution (LTE) network, a New Radio (NR) network, and a 5G-based next-generation mobile communication network. The mobile communication network 140 includes at least one network element. Illustratively, the mobile communication network 140 includes at least one core network element 142 and at least one access network element 144. The core network element 142 may be a Mobility Management Entity (MME), a Serving Gateway (SGW), a Packet-Data Network Gateway (P-GW or PDN-GW), or other network element having similar capabilities. The access network element 144 may be a base station. For example, the base station may be a base station (gNB) using a centralized distributed architecture in a 5G system. When the access network element 144 adopts a centralized distributed architecture, it usually includes a central unit (CU) and at least two distributed units (DU). The central unit is provided with a protocol stack of a Packet Data Convergence Protocol (PDCP) layer, a Radio Link Control (RLC) layer, and a Media Access Control (MAC) layer. The distributed unit is provided with a physical (PHY) layer protocol stack. The specific implementation manner of the access network element 144 is not limited in the embodiments of the present disclosure. According to exemplary embodiments, the access network element may further include a home base station (Home eNB, HeNB), a relay station (Relay), a pico base station, and the like.

There is at least one core network element 142 connected to the external network 160, and the core network element 142 has a data forwarding capability to implement communication between the terminal 120 and the external network 160. A wireless connection is established between the access network element 144 and the terminal 120 through a wireless air interface. According to exemplary embodiments, the wireless air interface is a wireless air interface based on the fifth generation mobile communication network technology (5G) standard, for example, the wireless air interface is a New Radio (NR) interface, or the wireless air interface may also be a wireless air interface based on a next generation (which is a next generation of 5G) mobile communication network technology standards.

The external network 160 may be an external Internet Protocol (IP) network or an external vertical network. According to exemplary embodiments, the external network 160 is a network suitable for vertical industries such as agriculture, manufacturing, logistics, transportation, living services, public services, education, finance, medical care, and energy. For example, the external network 160 is a network used for automatic meter reading in the power industry. As another example, the external network 160 is used for automatic meter reading in the water conservancy industry. As another example, the external network 160 is an IP network used in the education industry. The external network 160 uses a communication protocol different from the mobile communication network 140, that is, the external network 160 is a network different from the mobile communication network 140.

According to exemplary embodiments, the external network 160 includes a network element 162, and the network element 162 may be a control network element, a data network element, or a terminal or a sensor. The specific type of the network element 162 is not limited in the embodiments of the present disclosure.

According to exemplary embodiment, the network element 162 and a network element (a core network element or an access network element) in the mobile communication network 140 have a predefined control plane interface. The control plane interface is used to implement the sending and receiving of control plane signaling by the network element 162, and the control plane interface may be a logical interface on a wireless network or a wired network. For example, the logical interface exists on optical cable, and the logical interface exists on the electricity cable. The network element 162 may communicate control plane data with a network element in the mobile communication network 140 through the control plane interface. Alternatively, when there is no control plane interface between the network element 162 and the network element in the mobile communication network 140, the network element 162 and the mobile communication network 140 may also perform control plane data communication through ordinary IP data packets. Embodiments of the present disclosure do not impose specific limitations on this.

According to exemplary embodiments, the network element 162 also has a predefined data plane interface with a network element (a core network element or an access network element) in the mobile communication network 140. The data plane interface is used to implement sending and receiving of data packets of related services by the network element 162, and the data plane interface may be a logical interface on a wireless network or a wired network. For example, the logical interface exists on the optical cable, and the logical interface exists on electricity cable. The network element 162 can implement sending and receiving data packets with the terminal 120 through the data plane interface. Alternatively, when there is no data plane interface between the network element 162 and the network element in the mobile communication network 140, the network element 162 and the mobile communication network 140 may also perform data plane data communication through ordinary IP data packets. Embodiments of the present disclosure do not impose specific limitations on this.

It should be noted that, in the communication network shown in FIG. 1, the numbers of the terminal 120, the core network element 142, the access network element 144, and the network element 162 are only exemplary. In specific implementations, the numbers of the terminal 120, the core network element 142, the access network element 144, and the network element 162 may be one or more, which is not limited in the embodiments of the present disclosure.

Figure 2:
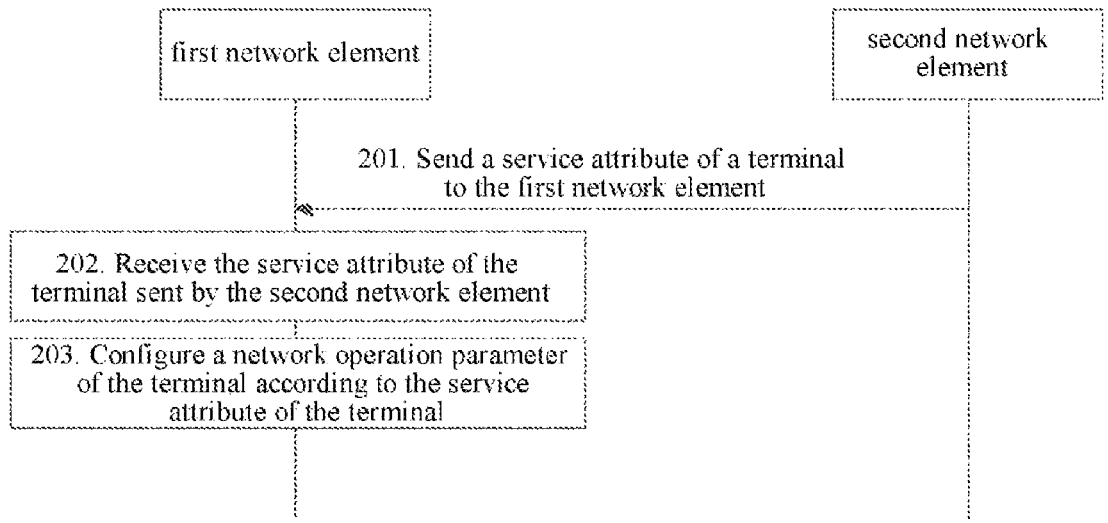
FIG. 2 is a flowchart of a network configuration method according to an exemplary embodiment of the present disclosure.

FIG. 2 shows a flowchart of a network configuration method according to an exemplary embodiment of the present disclosure. The first network element in this embodiment may be the core network element 142 or the access network element 144 in the mobile communication network 140 shown in FIG. 1, and the second network element may be the network element 162 in the external network 160 shown in FIG. 1. The method includes the following steps:

In step 201, the second network element sends a service attribute of a terminal to the first network element.

According to exemplary embodiments, a service exists between the second network element and the terminal, and service data of the service is transmitted through at least one data packet. For example, the service data may be data that the second network element needs to report to the terminal periodically, or the service data may be data that the terminal needs to report to the second network element periodically.

The service attribute is attribute information related to the service. According to exemplary embodiments, the service attribute is attribute information related to a data packet in the service.

According to exemplary embodiments, the service attribute of the terminal includes: length information of the data packet, and/or information about the arrival interval of the data packet.

According to exemplary embodiments, the second network element sends the service attribute of the terminal to the first network element through a predefined interface. The service attribute may also include the identifier of the terminal. The identifier of the terminal may be a first identifier in the mobile communication network, such as a Cell Radio-Network Temporary Identifier (C-RNTI). Or, the identifier of the terminal may be a universal identifier in both the mobile communication network and the external network, such as International Mobile Equipment Identifier (IMEI). Or, the identifier of the terminal may be a second identifier of the terminal in the external network, and in this case, the mobile communication network can store the correspondence between the first identifier and the second identifier of the terminal In step 202, the first network element receives the service attribute of the terminal sent by the second network element.

According to exemplary embodiments, the first network element receives the service attribute of the terminal sent by the second network element through a predefined interface.

In step 203, the first network element configures a network operation parameter of the terminal according to the service attribute of the terminal.

According to exemplary embodiments, the network operation parameter of the terminal is a service-related operation parameter. The process of configuring the network operation parameter may be configuring the network operation parameter in the terminal; and/or configuring the network operation parameter related to the terminal in the access network element; and/or, configuring the network operation parameter related to the terminal in the core network element.

In view of the above, in the network configuration method provided by embodiments of the present disclosure, the service attribute of the terminal is sent to the first network element in the mobile communication network by the second network element in the external network, and the first network element configures the network operation parameter(s) of the terminal according to the service attribute of the terminal. Unlike related art in which the first network element usually configures the network operation parameter(s) of the terminal according to a Scheduling Request (SR) and current channel conditions sent by the terminal, the present disclosure can implement a more optimized configuration for the terminal in conjunction with the external network, thereby improving the service transmission efficiency between the terminal and the second network element.

Figure 3:
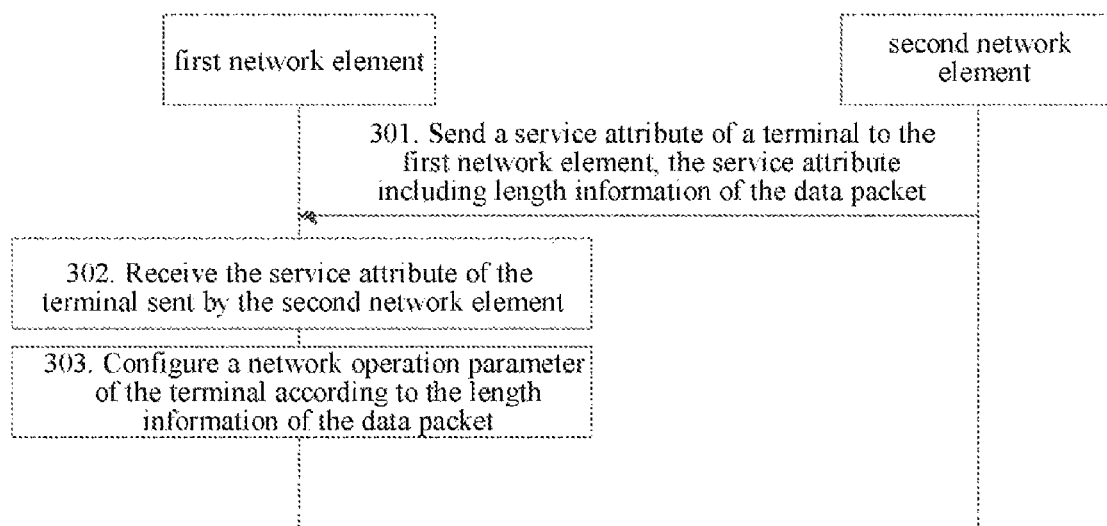
FIG. 3 is a flowchart of a network configuration method according to another exemplary embodiment of the present disclosure.

In an exemplary embodiment based on FIG. 2, the service attribute of the terminal includes length information of a data packet. As shown in FIG. 3, the method includes:

In step 301, the second network element sends a service attribute of the terminal to the first network element. The service attribute includes length information of the data packet.

The data packet of the terminal includes a data packet sent by the terminal to the second network element, and/or a data packet sent by the second network element to the terminal.

According to exemplary embodiments, the second network element sends the length information of the data packet of the terminal to the first network element through a predefined interface. The length information can be expressed in different ways. The length information may also be referred to as the size information of the data packet.

According to exemplary embodiments, the length information may be any one of the following four types of information:

1. The length of the data packet: for example, the length of the data packet is 256 bit;
2. The length range of the data packet: for example, the length range of the data packet is [100 bits, 120 bits];
3. The distribution probability of the length of the data packet: for example, the probability that the length of the data packet is 256 bits is 60%, and the probability that the length of the data packet is 128 bits is 40%;
4. The distribution probability of the length range of the data packet: for example, the probability that the length of the data packet belongs to the range [100 bits, 200 bits] is 98%, and the probability that the length of the data packet belongs to the range [201 bits, 400 bits] is 2%.

According to exemplary embodiments, the service attribute further includes an identifier of the terminal.

In step 302, the first network element receives the service attribute of the terminal sent by the second network element.

According to exemplary embodiments, the first network element receives the length information of the data packet of the terminal sent by the second network element through a predefined interface. The first network element may also receive the identifier of the terminal sent simultaneously by the second network element.

In step 303, the first network element configures network operation parameter of the terminal according to the length information of the data packet.

The network operation parameter of the terminal is a service-related operation parameter. The process of configuring the network operation parameter may be configuring the network operation parameter in the terminal; and/or configuring the network operation parameter related to the terminal in the access network element; and/or, configuring the network operation parameter related to the terminal in the core network element.

According to exemplary embodiments, the first network element configures at least one network operation parameter related to the terminal according to the length information of the data packet of the terminal. The at least one network operation parameter includes, but is not limited to the following parameters.

1. QoS Parameter

A QoS parameter is a parameter used to ensure the transmission rate, reliability, bit error rate, and packet loss rate of data packets.

According to exemplary embodiments, when the length of the data packet is smaller than a threshold, a first set of QoS parameters are configured for the terminal; when the length of the data packet is greater than the threshold, a second set of QoS parameters are configured for the terminal. The second set of QoS parameters are better than the first set of Qos parameters to ensure that the number of retransmissions is reduced when the data packet is large. The QoS parameter includes but not limited to at least one of QoS Class Identifier (QCI), Allocation/Retention Priority (ARP), Guaranteed Bit Rate (GBR), Maximum Bit Rate (MBR). A QCI can be used to define a set of scheduling weights, cache queue management thresholds, and link layer protocol configuration and the like. The embodiments of the present disclosure do not limit the specific configuration manner of the first network element.

2. The Amount of Time-Frequency Resources

The time-frequency resource may be a physical resource block (PRB), a physical resource block pair (PRB pair), a physical resource block group (RBG), or a virtual resource block (VRB). According to exemplary embodiments, a PRB pair includes 12 consecutive subcarriers in the frequency domain and 14 consecutive symbols in the time domain. The symbol is an Orthogonal Frequency Division Multiplexing (OFDM) symbol or a Single-Carrier Frequency Division Multiple Access (SC-FDMA) symbol of a mobile communication system in which the frequency domain where a subcarrier is located is 15 kHz. Or, the symbol is a symbol of a communication system in which the frequency domain of a subcarrier is greater than 15 kHz. A PRB occupies a resource of a transmission time length in the time domain. In different mobile communication versions, the transmission time length can be any number of symbols from 1 symbol to 14 symbols.

According to exemplary embodiments, the first network element may configure the amount of time-frequency resources allocated to the terminal according to the length information of the data packet. For example, the length range of the data packet that the terminal needs to send each time is [100 bits, 200 bits], the first network element can allocate each time for the terminal uplink time-frequency resources sufficient for transmitting 200-bit data packets in consideration of the current channel conditions of the terminal and the modulation and coding scheme used by the terminal and so on. For another example, if the length of all data packets is 10 MB, the first network element configures for the terminal an uplink time-frequency resource sufficient for transmitting 10 MB of data.

3. Transmission Mode

Since different multi-antenna transmission schemes correspond to different transmission modes, the first network element can dynamically configure different transmission modes to the terminal according to the length information of the data packet.

4. Security Mechanism

The security mechanism is related to identity authentication and data transmission security and so on.

For example, when the length information of the data packet is smaller than a first threshold, the first network element starts a security mechanism for the terminal. For another example, when the length information of the data packet is a specified length range, the first network element starts a security mechanism for the terminal. For another example, when the length information of the data packet is smaller than a second threshold, the terminal is configured to use a first encryption and decryption algorithm to encrypt and decrypt the data packet. When the length information of the data packet is greater than the second threshold, the terminal is configured to use a second encryption and decryption algorithm to encrypt and decrypt the data packet. The algorithm complexity of the first encryption and decryption algorithm is smaller than that of the second encryption and decryption algorithm, so that the transmission delay introduced by the encryption and decryption process can be reduced when the data packet is small.

In view of the above, in the network configuration method according to embodiments of the present disclosure, the length information of a data packet of a terminal is sent to a first network element in a mobile communication network through a second network element in an external network, and the first network element dynamically configures the network operation parameters of the terminal according to the length information of the data packet. In this way, the first network element can configure appropriate network operation parameters for the terminal under different length information of the data packet, thereby improving the efficiency and success rate in data packet transmission between the terminal and the second network element and reducing delay In an exemplary embodiment based on FIG. 3, the service attribute of the terminal further includes a time period corresponding to the length information. As an example, the length information of the data packet in a first time period is that length information 1, the length information of the data packet in a second time period is length information 2, and the length information of the data packet in a third time period is length information 3. That is, different time periods may correspond to different length information.

The first network element may configure the network operation parameter(s) of the terminal according to the length information of the data packet, the time period corresponding to the length information, and the current time. As an example, the first network element determines the time period to which the current time belongs, searches the length information of the data packet corresponding to the time period, and configures the network operation parameter(s) of the terminal according to the length information of the data packet corresponding to the time period.

In the network configuration method according to the embodiment, appropriate network operation parameter(s) can be configured for the terminal in different time periods according to the length information of the data packet in different time periods, so that the efficiency and success rate in data packet transmission between the terminal and the second network element can be improved in different time periods, and delay can be reduced.

In an exemplary embodiment based on FIG. 3, the service attribute of the terminal further includes a geographic area corresponding to the length information. As an example, the length information of the data packet in a first geographic area is length information 1, the length information of the data packet in a second geographic area is length information 2, and the length information of the data packet in a third geographic area is length information 3. That is, different geographic areas may correspond to different length information.

The first network element may obtain the current geographic location of the terminal, and configure the network operation parameter(s) of the terminal according to the length information of the data packet, the geographic area corresponding to the length information and the current geographic location where the terminal is currently located. As an example, the first network element determines the target geographic area where the current geographic location of the terminal is located, searches the length information of the data packet corresponding to the target geographic area, and configures the network operation parameter(s) of the terminal according to the length information of the data packet corresponding to the target geographic area.

In the network configuration method according to the embodiment, suitable network operation parameter(s) can be configured for the terminal located in different geographic areas according to the length information of data packet in different geographic areas. In this way, suitable network operation parameter(s) can be configured when the terminal is located in different geographic areas. Thus, the efficiency and success rate in data packet transmission between the terminal and the second network element can be improved in different geographic areas, and the delay can be reduced.

In an exemplary embodiment based on FIG. 3, the service attribute of the terminal further includes a PLMN corresponding to the length information. As an example, the length information of the data packet in a first PLMN is length information 1, the length information of the data packet in a second PLMN is length information 2, and the length information of the data packet in a third PLMN is length information 3. That is, different PLMNs can correspond to different length information.

The first network element can obtain the current PLMN where the terminal is located, and configure the network operation parameter(s) of the terminal according to the length information of the data packet, the PLMN corresponding to the length information, and the current PLMN where the terminal is located. As an example, the first network element determines the current PLMN of the terminal, searches the length information of the data packet corresponding to the current PLMN, and configures the network operation parameter(s) of the terminal according to the length information of the data packet corresponding to the current PLMN.

In the network configuration method according to the embodiment, suitable network operation parameter(s) can be configured for the terminal using different PLMNs according to the length information of data packet corresponding to different PLMNs. In this way, suitable network operation parameter(s) can be configured for the terminal when the terminal is in different PLMNs. Therefore, the efficiency and success rate in data packet transmission between the terminal and the second network element can be improved in different PLMNs, and the delay can be reduced.

Network slicing is a feature introduced in the 5G network. The 5G network supports different applications in three scenarios: eMBB, mMTC, and uMTC. If different dedicated networks are set up for different applications, a lot of resources will be wasted. Therefore, with the development of Network Function Virtualization (NFV), the 5G network can build different virtual networks for different service needs. Network slicing is based on the common physical basic settings to logically define and divide networks to form end-to-end virtual networks. The virtual networks each have different functional characteristics. A typical network slice includes a set of virtualized access network functions and core network functions to form an end-to-end private network.

In an exemplary embodiment based on FIG. 3, the service attribute of the terminal further includes network slice information corresponding to the length information. As an example, the length information of the data packet in a first network slice is length information 1, the length information of the data packet in a second network slice is length information 2, and the length information of the data packet in a third network slice is length information 3. That is, different network slices may correspond to different length information.

The first network element may obtain the current network slice where the terminal is located, and configure the network operation parameter(s) of the terminal according to the length information of the data packet, the network slice corresponding to the length information, and the current network slice where the terminal is located. As an example, the first network element determines the current network slice of the terminal, searches the length information of the data packet corresponding to the current network slice, and configures the network operation parameter(s) of the terminal according to the length information of the data packet corresponding to the current network slice.

In the network configuration method according to the embodiment, suitable network operation parameter(s) can be configured for the terminal using different network slice according to the length information of data packet corresponding to different network slices. In this way, suitable network operation parameter(s) can be configured for the terminal when the terminal is in different network slices. Thus, the efficiency and success rate in data packet transmission between the terminal and the second network element can be improved in different network slices, and the delay can be reduced.

Figure 4:
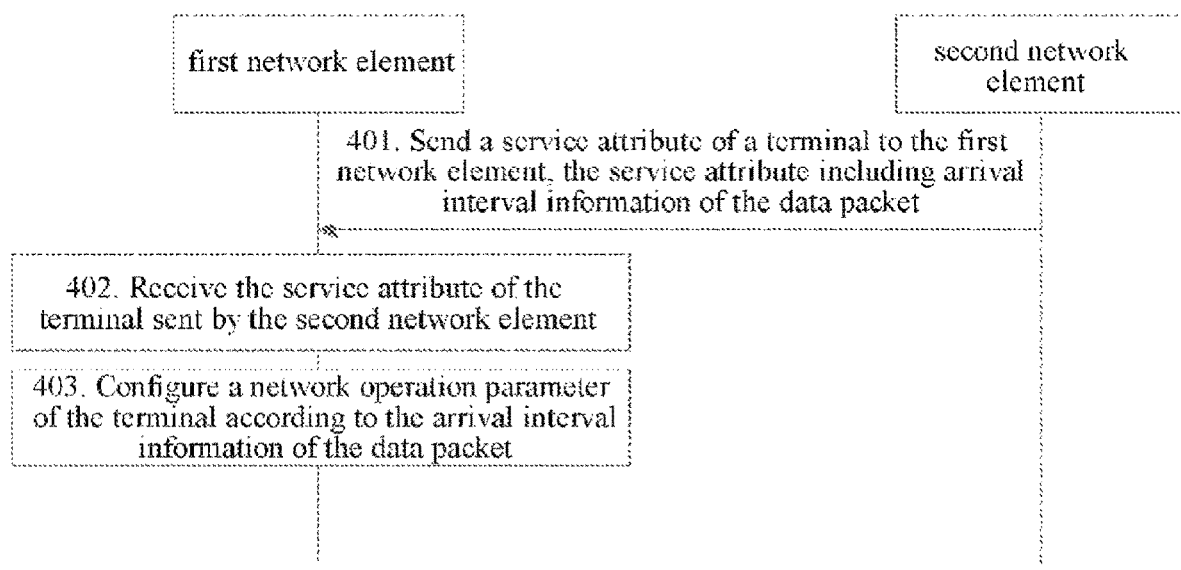
FIG. 4 is a flowchart of a network configuration method according to another exemplary embodiment of the present disclosure.

In an exemplary embodiment based on FIG. 2, the service attribute of the terminal include arrival interval information of the data packet. As shown in FIG. 4, the method includes:

In step 401, the second network element sends the service attribute of the terminal to the first network element. The service attribute includes information about the arrival interval of the data packet.

The data packet of the terminal includes: a data packet sent by the terminal to the second network element, and/or a data packet sent by the second network element to the terminal. When data packets are sent regularly, there is an arrival interval between two adjacent data packets (or packet groups). For example, if the second network element sends a data packet to the terminal every 15 minutes, the arrival interval is 15 minutes.

According to exemplary embodiments, the second network element sends the arrival interval information of the data packet of the terminal to the first network element through a predefined interface. The arrival interval information can be expressed in different ways. The arrival interval information may also be referred to as size information of a packet.

According to exemplary embodiments, the arrival interval information may be any one of the following four types of information:

1. The duration of the arrival interval of the data packet: for example, the arrival interval of the data packet is 5 seconds, 10 minutes, 1 hour, and so on;

2. The duration range of the arrival interval of the data packet: for example, the duration range of the data packet arrival interval is [2 seconds, 4 seconds];

3. The distribution probability of the duration of the arrival interval of the data packet: for example, the probability that the duration of the arrival interval of the data packet is 15 minutes is 80%, and the probability that the duration of the arrival interval of the data packet is 20 minutes is 20%;

4. The distribution probability of the duration range of the arrival interval of the data packet: for example, the probability that the duration range of the arrival interval of data packet belongs to the range [8 seconds, 10 seconds] is 98%, and probability that the duration range of the arrival interval of data packet belongs to the range [10 seconds, 20 seconds] is 2%.

According to exemplary embodiments, the service attribute further includes an identifier of the terminal In step 402, the first network element receives the service attribute of the terminal sent by the second network element.

According to exemplary embodiments, the first network element receives the arrival interval information of the data packet of the terminal sent by the second network element through a predefined interface. The first network element may also receive the identifier of the terminal sent by the second network element at the same time.

In step 404, the first network element configures network operation parameter(s) of the terminal according to the arrival interval information of the data packet.

The network operation parameter of the terminal is a service-related operation parameter. The process of configuring the network operation parameter may be configuring the network operation parameter in the terminal; and/or configuring the network operation parameter related to the terminal in the access network element; and/or, configuring the network operation parameter related to the terminal in the core network element.

According to exemplary embodiments, the first network element configures at least one network operation parameter related to the terminal according to the arrival interval information of the data packet of the terminal. The at least one network operation parameter includes, but is not limited to the following parameters.

1. QoS Parameter

A QoS parameter is a parameter used to ensure the transmission rate, reliability, bit error rate, and packet loss rate of data packets.

According to exemplary embodiments, when the arrival interval of the data packet is smaller than a threshold, a first set of QoS parameters are configured for the terminal; when the arrival interval of the data packet is greater than the threshold, a second set of QoS parameters are configured for the terminal. The first set of QoS parameters are better than the second set of Qos parameters to ensure that the number of retransmissions is reduced when the arrival interval is small. The QoS parameter includes but not limited to at least one of QoS Class Identifier (QCI), Allocation/Retention Priority (ARP), Guaranteed Bit Rate (GBR), Maximum Bit Rate (MBR). A QCI can be used to define a set of scheduling weights, cache queue management thresholds, and link layer protocol configuration and the like. The embodiments of the present disclosure do not limit the specific configuration manner of the first network element.

2. The Position of Time-Frequency Resources

The time-frequency resource may be a physical resource block (PRB), a physical resource block pair (PRB pair), a physical resource block group (RBG), or a virtual resource block (VRB). According to exemplary embodiments, a PRB pair includes 12 consecutive subcarriers in the frequency domain and 14 consecutive symbols in the time domain. The symbol is an Orthogonal Frequency Division Multiplexing (OFDM) symbol or a Single-Carrier Frequency Division Multiple Access (SC-FDMA) symbol of a mobile communication system in which the frequency domain where a subcarrier is located is 15 kHz. Or, the symbol is a symbol of a communication system in which the frequency domain of a subcarrier is greater than 15 kHz. A PRB occupies a resource corresponding to an arrival interval in transmission time in the time domain. In different mobile communication versions, the transmission time length can be any number of symbols from 1 symbol to 14 symbols.

According to exemplary embodiments, the first network element may configure the position of time-frequency resources allocated to the terminal according to the arrival interval information of the data packet. For example, the arrival interval range of the data packet that the terminal needs to send each time is [5 seconds, 6 seconds], the first network element can configure the time-frequency resource location to be used next time in consideration of the time-frequency resource location and the arrival interval range used by the terminal this time.

3. Transmission Mode

Since different multi-antenna transmission schemes correspond to different transmission modes, the first network element can dynamically configure different transmission modes to the terminal according to the arrival interval information of the data packet.

4. Security Mechanism

The security mechanism is related to identity authentication and data transmission security and so on.

For example, when the arrival interval information of the data packet is smaller than a first threshold, the first network element starts a security mechanism for the terminal. For another example, when the arrival interval information of the data packet is a specified arrival interval range, the first network element starts a security mechanism for the terminal. For another example, when the arrival interval information of the data packet is smaller than a second threshold, the terminal is configured to use a first encryption and decryption algorithm to encrypt and decrypt the data packet. When the arrival interval information of the data packet is greater than the second threshold, the terminal is configured to use a second encryption and decryption algorithm to encrypt and decrypt the data packet. The algorithm complexity of the first encryption and decryption algorithm is smaller than that of the second encryption and decryption algorithm, so that the transmission delay introduced by the encryption and decryption process can be reduced when the arrival interval of the data packet is small.

5. Scheduling Strategy

Scheduling strategies can be divided into uplink scheduling strategies and downlink scheduling strategies. When the data packet is sent periodically, the first network element may semi-statically configure the time-frequency resources used by the terminal according to the arrival interval information of the data packet.

6. DRX Cycle

Alternatively, the first network element may configure a discontinuous reception (DRX) cycle for the terminal according to the arrival interval information of the data packet. In each DRX cycle, the terminal can be waken up in only one subframe to receive the data packet sent by the second network element. In other DRX cycles, the terminal can turn off the receiving circuit to enter a sleep state, which makes the terminal's power consumption greatly reduced.

In view of the above, in the network configuration method according to embodiments, the arrival interval information of the data packet of the terminal is sent to the first network element in the mobile communication network by the second network element in the external network, and the first network element dynamically configures the network operation parameter(s) of the terminal according to the arrival interval information of the data packet. In this way, the first network element can configure appropriate network operation parameter(s) for the terminal under different arrival interval information of the data packet, thereby improving the efficiency and success rate in data packet transmission between the terminal and the second network element, and reducing the delay.

In an exemplary embodiment based on FIG. 4, the service attribute of the terminal further include a time period corresponding to the arrival interval information. As an example, the arrival interval information of the data packet in a first time period is arrival interval information 1, the arrival interval information of the data packet in a second time period is arrival interval information 2, and the arrival of the data packet in a third time period is arrival interval information 4. That is, different time periods may correspond to different arrival interval information.

The first network element may configure the network operation parameter(s) of the terminal according to the arrival interval information of the data packet, the time period corresponding to the arrival interval information, and the current time. As an example, the first network element determines the time period to which the current time belongs, searches the arrival interval information of the data packet corresponding to the time period, and configures the network operation parameter(s) of the terminal according to the arrival interval information of the data packet corresponding to the time period.

In the network configuration method according to the embodiment, appropriate network operation parameter(s) can be configured for the terminal in different time periods according to the arrival interval information of the data packet in different time periods, so that the efficiency and success rate in data packet transmission between the terminal and the second network element can be improved in different time periods, and delay can be reduced.

In an exemplary embodiment based on FIG. 4, the service attribute of the terminal further includes a geographic area corresponding to the arrival interval information. As an example, the arrival interval information of the data packet in a first geographic area is arrival interval information 1, the arrival interval information of the data packet in a second geographic area is arrival interval information 2, and the arrival interval information of the data packet in a third geographic area is arrival interval information 4. That is, different geographic areas may correspond to different arrival interval information.

The first network element may obtain the current geographic location of the terminal, and configure the network operation parameter(s) of the terminal according to the arrival interval information of the data packet, the geographic area corresponding to the arrival interval information and the current geographic location where the terminal is currently located. As an example, the first network element determines the target geographic area where the current geographic location of the terminal is located, searches the arrival interval information of the data packet corresponding to the target geographic area, and configures the network operation parameter(s) of the terminal according to the arrival interval information of the data packet corresponding to the target geographic area.

In the network configuration method according to the embodiment, suitable network operation parameter(s) can be configured for the terminal located in different geographic areas according to the arrival interval information of data packet in different geographic areas. In this way, suitable network operation parameter(s) can be configured when the terminal is located in different geographic areas. Thus, the efficiency and success rate in data packet transmission between the terminal and the second network element can be improved in different geographic areas, and the delay can be reduced.

In an exemplary embodiment based on FIG. 4, the service attribute of the terminal further includes a PLMN corresponding to the arrival interval information. As an example, the arrival interval information of the data packet in a first PLMN is arrival interval information 1, the arrival interval information of the data packet in a second PLMN is arrival interval information 2, and the arrival interval information of the data packet in a third PLMN is arrival interval information 4. That is, different PLMNs can correspond to different arrival interval information.

The first network element can obtain the current PLMN where the terminal is located, and configure the network operation parameter(s) of the terminal according to the arrival interval information of the data packet, the PLMN corresponding to the arrival interval information, and the current PLMN where the terminal is located. As an example, the first network element determines the current PLMN of the terminal, searches the arrival interval information of the data packet corresponding to the current PLMN, and configures the network operation parameter(s) of the terminal according to the arrival interval information of the data packet corresponding to the current PLMN.

In the network configuration method according to the embodiment, suitable network operation parameter(s) can be configured for the terminal using different PLMNs according to the arrival interval information of data packet corresponding to different PLMNs. In this way, suitable network operation parameter(s) can be configured for the terminal when the terminal is in different PLMNs. Therefore, the efficiency and success rate in data packet transmission between the terminal and the second network element can be improved in different PLMNs, and the delay can be reduced.

Network slicing is a feature introduced in the 5G network. The 5G network supports different applications in three scenarios: eMBB, mMTC, and uMTC. If different dedicated networks are set up for different applications, a lot of resources will be wasted. Therefore, with the development of Network Function Virtualization (NFV), the 5G network can build different virtual networks for different service needs. Network slicing is based on the common physical basic settings to logically define and divide networks to form end-to-end virtual networks. The virtual networks each have different functional characteristics. A typical network slice includes a set of virtualized access network functions and core network functions to form an end-to-end private network.

In an exemplary embodiment based on FIG. 4, the service attribute of the terminal further includes network slice information corresponding to the arrival interval information. As an example, the arrival interval information of the data packet in a first network slice is arrival interval information 1, the arrival interval information of the data packet in a second network slice is arrival interval information 2, and the arrival interval information of the data packet in a third network slice is arrival interval information 4. That is, different network slices may correspond to different arrival interval information.

The first network element may obtain the current network slice where the terminal is located, and configure the network operation parameter(s) of the terminal according to the arrival interval information of the data packet, the network slice corresponding to the arrival interval information, and the current network slice where the terminal is located. As an example, the first network element determines the current network slice of the terminal, searches the arrival interval information of the data packet corresponding to the current network slice, and configures the network operation parameter(s) of the terminal according to the arrival interval information of the data packet corresponding to the current network slice.

In the network configuration method according to the embodiment, suitable network operation parameter(s) can be configured for the terminal using different network slice according to the arrival interval information of data packet corresponding to different network slices. In this way, suitable network operation parameter(s) can be configured for the terminal when the terminal is in different network slices. Thus, the efficiency and success rate in data packet transmission between the terminal and the second network element can be improved in different network slices, and the delay can be reduced.

It should be noted that any two of the above embodiments can be arbitrarily selected and combined. For example, the service attribute may include both length information of the data packet, the time period and geographic area corresponding to the length information, arrival interval information of the data packet, the time period and geographic area corresponding to the arrival interval information, and so on. This is easily understood by those skilled in the art according to the description of the above embodiments, and will not be described in detail herein.

Figure 5:
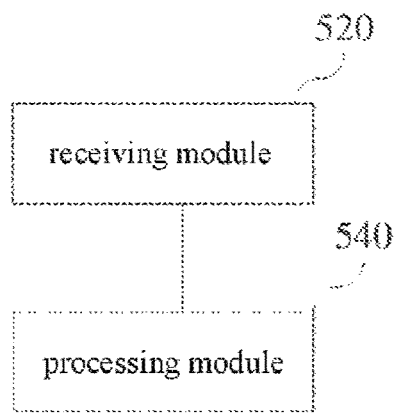
FIG. 5 is a block diagram of a network configuration device according to another exemplary embodiment of the present disclosure.

FIG. 5 is a structural block diagram of a network configuration device according to an exemplary embodiment of the present disclosure. The network configuration device may be implemented as all or part of the first network element through software, hardware, or a combination of both. The network configuration device includes a receiving module 520 and a processing module 540.

The receiving module 520 is configured to receive a service attribute of a terminal sent by a second network element. The device is a network element in a mobile communication network, and the second network element is a network element in an external network.

The processing module 540 is configured to configure a network operation parameter of the terminal according to the service attribute of the terminal.

According to an exemplary embodiment, the service attribute includes:
  length information of a data packet;
  or, the length information of the data packet and a time period corresponding to the length information;
  or, the length information of the data packet and a geographic area corresponding to the length information;
  or, the length information of the data packet, the time period corresponding to the length information, and the geographic area corresponding to the length information.

According to an exemplary embodiment, the length information of the data packet includes:
  a length of the data packet;
  a length range of the data packet;
  or, a distribution probability of the length of the data packet;
  or, a distribution probability of the length range of the data packet.

According to an exemplary embodiment, wherein the service attribute further includes:
  Public Land Mobile Network (PLMN) information corresponding to the length information of the data packet;
  and/or,
  network slice information corresponding to the length information of the data packet.

According to an exemplary embodiment, the processing module 540 is configured to configure the network operation parameter of the terminal according to the length information of the data packet;
  or, wherein the processing module 540 is configured to configure the network operation parameter of the terminal according to the length information of the data packet, the time period corresponding to the length information, and a current time;
  or, wherein the processing module is configured to configure the network operation parameter of the terminal according to the length information of the data packet, the geographic area corresponding to the length information, and a current geographic location where the terminal is located;
  or, wherein the processing module is configured to configure the network operation parameter of the terminal according to the length information of the data packet, the time period corresponding to the length information, the current time, the geographic area corresponding to the length information, and the current geographic location where the terminal is located.

According to an exemplary embodiment, the network operation parameter includes at least one of the following parameters: a Quality of Service (QoS) parameter; an amount of time-frequency resources; a transmission mode; and a security mechanism.

According to an exemplary embodiment, the service attribute includes:
  arrival interval information of a data packet;
  or, the arrival interval information of the data packet and a time period corresponding to the arrival interval information;
  or, the arrival interval information of the data packet and a geographic area corresponding to the arrival interval information;
  or, the arrival interval information of the data packet, the time period corresponding to the arrival interval information, and the geographic area corresponding to the arrival interval information.

According to an exemplary embodiment, the arrival interval information of the data packet includes:
  a duration of an arrival interval of the data packet;
  or, a duration range of the arrival interval of the data packet;
  or, a distribution probability of the duration of the arrival interval of the data packet;
  or, a distribution probability of the duration range of the arrival interval of the data packet.

According to an exemplary embodiment, the service attribute further includes:
  PLMN information corresponding to the arrival interval information of the data packet;
  and/or,
  network slice information corresponding to the arrival interval information of the data packet.

According to an exemplary embodiment, the processing module 540 is configured to configure the network operation parameter of the terminal according to the arrival interval information of the data packet;
  or, wherein the processing module is configured to configure the network operation parameter of the terminal according to the arrival interval information of the data packet, the time period corresponding to the arrival interval information, and a current time;

or, wherein the processing module is configured to configure the network operation parameter of the terminal according to the arrival interval information of the data packet, the geographic area corresponding to the arrival interval information, and a current geographic location where the terminal is located;

or, wherein the processing module is configured to configure the network operation parameter of the terminal according to the arrival interval information of the data packet, the time period corresponding to the arrival interval information, the current time, the geographic area corresponding to the arrival interval information, and the current geographic location where the terminal is located.

According to an exemplary embodiment, the network operation parameter includes at least one of the following parameters: a Quality of Service (QoS) parameter; a time-frequency resource location; a transmission mode; a security mechanism; a scheduling strategy; and a discontinuous reception (DRX) cycle.

Figure 6:
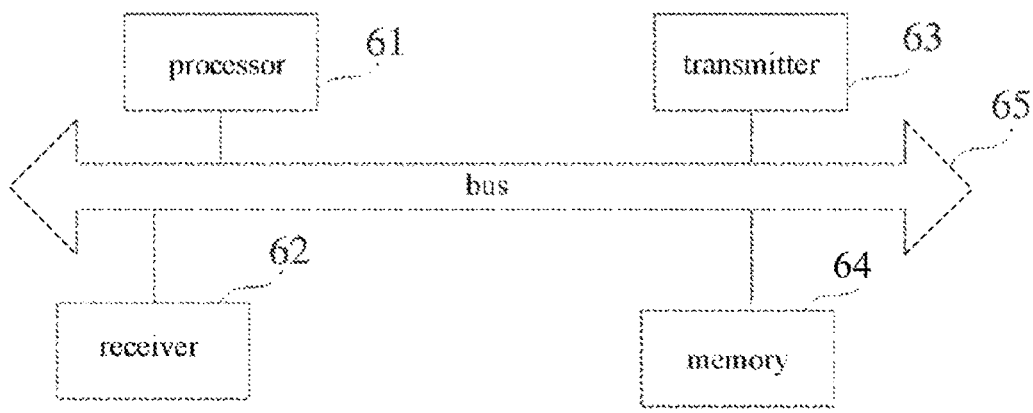
FIG. 6 is a structural block diagram of a first network element according to another exemplary embodiment of the present disclosure.

FIG. 6 shows a schematic structural diagram of a terminal according to an exemplary embodiment of the present disclosure. The terminal includes a processor 61, a receiver 62, a transmitter 63, a memory 64, and a bus 65.

The processor 61 includes one or more processing cores. The processor 61 executes various functional applications and information processing by running software programs and modules.

The receiver 62 and the transmitter 63 may be implemented as one communication component. The communication component may be a communication chip. The communication chip may include a receiving module, a transmitting module, a modem module, and the like, and the communication chip is used to modulate and/or demodulate information and receive or send the information via wireless signals.

The memory 64 is connected to the processor 61 via the bus.

The memory 64 may be configured to store at least one instruction, and the processor 61 is configured to execute the at least one instruction to implement each step in the foregoing method embodiments.

In addition, the memory 64 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

Figure 7:
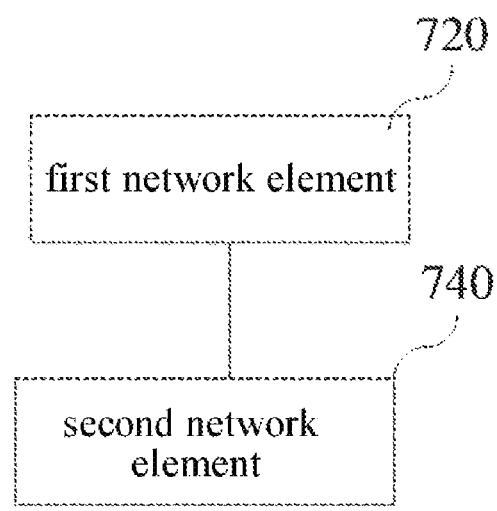
FIG. 7 is a block diagram of a communication system according to another exemplary embodiment of the present disclosure.

As shown in FIG. 7, an embodiment of the present disclosure further provides a communication system, and the communication system may include a first network element 720 and a second network element 740.

The first network element 720 receives a service attribute of a terminal sent by the second network element 740. The first network element 720 is a network element in a mobile communication network, and the second network element 740 is a network element in an external network.

The first network element 720 configures a network operation parameter of the terminal according to the service attribute of the terminal.

Those skilled in the art should understand that in one or more of the above examples, the functions described in the embodiments of the present disclosure may be implemented by hardware, software, firmware, or any combination thereof. When implemented in software, these functions may be stored in a computer-readable medium or may be transmitted as one or more instructions or codes in the computer-readable medium. The computer-readable medium includes a computer storage medium and a communication medium, and the communication medium includes any medium that facilitates transfer of a computer program from one place to another. The storage medium may be any available medium that can be accessed by a general purpose or special purpose computer.

The above are only exemplary embodiments of the present disclosure and are not intended to limit the present disclosure. Any modification, equivalent substitute, or improvement made within the spirit and principle of the present disclosure fall within the protection scope of the present disclosure.

What is claimed is:

1. A network configuration method, comprising:
   receiving, by a first network element, a service attribute of a terminal sent by a second network element, wherein the first network element is a network element in a mobile communication network, and the second network element is a network element in an external network, and the external network uses a communication protocol different from a communication protocol used by the mobile communication network; and
   configuring, by the first network element, a discontinuous reception (DRX) cycle of the terminal according to the service attribute of the terminal;
   wherein the service attribute comprises arrival interval information of a data packet and a time period corresponding to the arrival interval information;
   wherein the arrival interval of the data packet is 1 hour.

2. The method according to claim 1, wherein the service attribute further comprises:
   length information of a data packet;
   or, the length information of the data packet and a time period corresponding to the length information;
   or, the length information of the data packet and a geographic area corresponding to the length information;
   or, the length information of the data packet, the time period corresponding to the length information, and the geographic area corresponding to the length information.

3. The method according to claim 2, wherein the length information of the data packet comprises:
   a length of the data packet;
   a length range of the data packet;
   or, a distribution probability of the length of the data packet;
   or, a distribution probability of the length range of the data packet.

4. The method according to claim 2, wherein the service attribute further comprises at least one of the following:
   Public Land Mobile Network (PLMN) information corresponding to the length information of the data packet; and
   network slice information corresponding to the length information of the data packet.

5. The method according to claim 2, wherein configuring, by the first network element, the DRX cycle of the terminal according to the service attribute of the terminal, comprises:
   configuring, by the first network element, the DRX cycle of the terminal according to the length information of the data packet;
   or, configuring, by the first network element, the DRX cycle of the terminal according to the length information of the data packet, the time period corresponding to the length information, and a current time;

or, configuring, by the first network element, the DRX cycle of the terminal according to the length information of the data packet, the geographic area corresponding to the length information, and a current geographic location where the terminal is located;

or, configuring, by the first network element, the DRX cycle of the terminal according to the length information of the data packet, the time period corresponding to the length information, the current time, the geographic area corresponding to the length information, and the current geographic location where the terminal is located.

6. The method according to claim 1, wherein the arrival interval information of the data packet comprises:
a duration of an arrival interval of the data packet;
or, a duration range of the arrival interval of the data packet;
or, a distribution probability of the duration of the arrival interval of the data packet;
or, a distribution probability of the duration range of the arrival interval of the data packet.

7. The method according to claim 1, wherein the service attribute further comprises:
PLMN information corresponding to the arrival interval information of the data packet;
and/or,
network slice information corresponding to the arrival interval information of the data packet.

8. The method according to claim 1, wherein configuring, by the first network element, the DRX cycle of the terminal according to the service attribute of the terminal, comprises:
configuring, by the first network element, the DRX cycle of the terminal according to the arrival interval information of the data packet;
or, configuring, by the first network element, the DRX cycle of the terminal according to the arrival interval information of the data packet, the time period corresponding to the arrival interval information, and a current time;
or, configuring, by the first network element, the DRX cycle of the terminal according to the arrival interval information of the data packet, a geographic area corresponding to the arrival interval information, and a current geographic location where the terminal is located;
or, configuring, by the first network element, the DRX cycle of the terminal according to the arrival interval information of the data packet, the time period corresponding to the arrival interval information, the current time, the geographic area corresponding to the arrival interval information, and the current geographic location where the terminal is located.

9. A network configuration device, comprising:
a processor;
a memory for storing instructions executable by the processor; and
a receiver;
wherein the processor is configured to receive, via the receiver, a service attribute of a terminal sent by a second network element, wherein the device is a network element in a mobile communication network, and the second network element is a network element in an external network, and the external network uses a communication protocol different from a communication protocol used by the mobile communication network; and
wherein the processor is further configured to configure a discontinuous reception (DRX) cycle of the terminal according to the service attribute of the terminal;
wherein the service attribute comprises: arrival interval information of a data packet and a time period corresponding to the arrival interval informations;
wherein the arrival interval of the data packet is 1 hour.

10. The device according to claim 9, wherein the service attribute further comprises:
length information of a data packet;
or, the length information of the data packet and a time period corresponding to the length information;
or, the length information of the data packet and a geographic area corresponding to the length information;
or, the length information of the data packet, the time period corresponding to the length information, and the geographic area corresponding to the length information.

11. The device according to claim 10, wherein the length information of the data packet comprises:
a length of the data packet;
a length range of the data packet;
or, a distribution probability of the length of the data packet;
or, a distribution probability of the length range of the data packet.

12. The device according to claim 10, wherein the service attribute further comprises at least one of the following:
Public Land Mobile Network (PLMN) information corresponding to the length information of the data packet; and
network slice information corresponding to the length information of the data packet.

13. The device according to claim 10, wherein the processor is configured to configure the DRX cycle of the terminal according to the length information of the data packet;
or, wherein the processor is configured to configure the DRX cycle of the terminal according to the length information of the data packet, the time period corresponding to the length information, and a current time;
or, wherein the processor is configured to configure the DRX cycle of the terminal according to the length information of the data packet, the geographic area corresponding to the length information, and a current geographic location where the terminal is located;
or, wherein the processor is configured to configure the DRX cycle of the terminal according to the length information of the data packet, the time period corresponding to the length information, the current time, the geographic area corresponding to the length information, and the current geographic location where the terminal is located.

14. The device according to claim 9, wherein the arrival interval information of the data packet comprises:
a duration of an arrival interval of the data packet;
or, a duration range of the arrival interval of the data packet;
or, a distribution probability of the duration of the arrival interval of the data packet;
or, a distribution probability of the duration range of the arrival interval of the data packet.

15. The device according to claim 9, wherein the service attribute further comprises:
   PLMN information corresponding to the arrival interval information of the data packet;
   and/or,
   network slice information corresponding to the arrival interval information of the data packet.

* * * * *